Patented Apr. 10, 1951

2,547,949

UNITED STATES PATENT OFFICE 2,547,949

LOWER ALKOXYALKANOATES OF HYDROXYLATED HORMONES AND PROCESS OF PRODUCING SAME

Elmer J. Lawson, East Greenbush, Chester J. Cavallito, Ravena, and Aram Mooradian, Troy, N. Y., assignors to Sterling Drug Inc., Wilmington, Del., a corporation of Delaware No Drawing. Application September 13, 1947, Serial No. 773,944

19 Claims. (Cl. 260—397.4)

This invention relates to a new class of esters of hydroxylated hormones, namely, the lower alkoxyalkanoates, and to a method of preparing the same. More particularly, it relates to such esters of testosterone.

Ever since early workers in the field found that certain esters of androgenic hormones had a greatly prolonged duration of action, in contrast to the transient action of the parent hydroxysteroids, intensive research programs have been aimed at finding more efficacious esters and other derivatives of sex and cortical hormones in general, and of testosterone in particular. In spite of the intensified effort to find suitable derivatives, the list of effective esters and other derivatives satisfactory for clinical use still remains surprisingly small; in fact, at the present time, only a few esters, notably the propionate, are available to the public for hormone therapy.

In its broader aspects, our invention comprehends lower alkoxyalkanoates of hydroxylated hormones, which in general show a much more marked and sustained activity than the free hormones. Our new compounds have the structure $Y(O-CO-X-O-R)_n$ where $Y(OH)_n$ is a hydroxy compound having sex or cortical hormone activity such as testosterone, estradiol, estrone, stilbestrol, or desoxycorticosterone, so that $Y$ is the radical left after removing the $n$ hydroxyl groups, $X$ is lower alkylene, and $R$ is lower alkyl.

In particular, we have found that testosterone alkoxyalkanoates of the formula

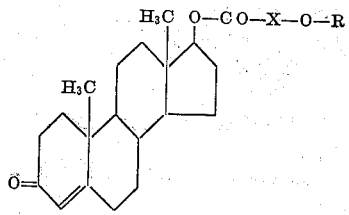

where R is a lower alkyl radical and X is a lower alkylene radical, have a pronounced and sustained androgenic activity, comparing favorably with the most potent testosterone esters currently used.

In the general formula given above, R is a lower alkyl radical having preferably no more than four carbon atoms, such as methyl, ethyl, 2-propyl, n-butyl, and the like, X is a lower alkylene radical having preferably no more than three carbon atoms, such as methylene, ethylene, trimethylene, 1,1-ethylene, 2,2-propylene, 1,1-propylene, and 1,2-propylene. Examples of such testosterone esters include: the methoxyacetate, the ethoxyacetate, the n-propoxyacetate, the n-butoxyacetate, the 3-(2-propoxy)propanoate, the 4-(n-propoxy)butanoate, the 2-methoxypropanoate, the 2-ethoxybutanoate, the 3-(n-propoxy)butanoate, and the like.

The compounds of our invention are conveniently prepared by the reaction of the hydroxylated hormone with either an alkoxyalkanoyl halide of the general formula,

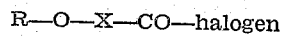

R—O—X—CO—halogen where R and X have the same meanings as given above, in the presence of an appropriate basic substance, or a corresponding alkoxyalkanoic anhydride in the presence of a base such as pyridine or fused potassium acetate. In practicing our invention we prefer to use, as the basic substance in the acid halide method of preparation, a tertiary amine such as pyridine, which not only acts as a recipient for the hydrogen chloride liberated by the reaction but also can act as a solvent for the reactants.

The alkoxyalkanoic acids are a generally known group of compounds and methods for their preparation are well known to those versed in the art. One general method is to treat a haloalkanoic acid with a sodium alcoholate; for example, see Organic Syntheses, Collective Volume II, p. 260 (John Wiley & Sons, Inc., New York, N. Y., 1943) for the preparation of ethoxyacetic acid from chloroacetic acid and sodium ethoxide.

The alkoxyalkanoyl halides are also a group of well known compounds. They are conveniently prepared from the corresponding alkoxyalkanoic acids by the various methods used to convert aliphatic carboxylic acids into acid halides, such as, by treating the acid with phosphorus trichloride, thionyl chloride, phosphorus tribromide, etc.; for example, see Blicke et al., J. Am. Chem. Soc. 63, 2488 (1941) for the preparation of 4-methoxybutanoyl chloride by treating the corresponding acid with thionyl chloride.

The corresponding alkoxyalkanoic anhydrides can be prepared by treating an alkali salt of an alkoxyalkanoic acid with an acid halide of the same acid; for example, see Sommelet, Ann. Chim. Phys. (8) 9, 484–574 (1906) (Chem. Zentr. 1907, I, 871) for the preparation of ethoxyacetic anhydride from potassium ethoxyacetate and ethoxyacetyl chloride.

As already indicated our invention contemplates alkoxyalkanoates of hydroxylated hormones in general, such as: other androgens, e. g., 17-methyltestosterone, etc.; estrogens, e. g., estrone, estradiol, stilbestrol, etc.; and adrenal cortical hormones, e. g., desoxycorticosterone, etc. Such esters include 17-methyltestosterone 3-methoxypropanoate, estrone ethoxyacetate, stilbestrol di(n-propoxyacetate), desoxycorticosterone 4-methoxybutanoate, and the like.

The compounds of our invention are further illustrated by the following examples. It is to be understood that our invention is not limited to these examples but only by the scope of the appended claims.

*Example 1*

*Testosterone 4-methoxybutanoate.*—To a solution of 0.6 g. of testosterone dissolved in a mixture of 25 ml. of dry ether and 4 ml. of dry pyridine is added a solution of 1 ml. of 4-methoxybutanoyl chloride in 10 ml. of dry ether. The resulting mixture is refluxed for one hour and poured into water. The aqueous mixture is extracted with ether, and the ether extract is washed with dilute sodium carbonate solution, dilute sulfuric acid, and water. Removal of the ether by distillation leaves a crude syrup which is dissolved in petroleum ether (n-pentane fraction). This petroleum ether solution is passed through a column of activated alumina and the alumina column is eluted with petroleum ether. Evaporation of the eluates yields about 0.73 g. of crude crystalline product, which, after several recrystallizations from petroleum ether (n-pentane fraction), melts at 55–7° C. This product, testosterone 4-methoxybutanoate, has an $[\alpha]_D^{26}$ of $+88.4°$ (this and subsequent optical rotations are determined with 1% ethanol solutions of the esters).

Other esters of testosterone which can be prepared in the above manner include the following: the 3-ethoxypropanoate, M. P. 53–5° C. and $[\alpha]_D^{29} +74.7°$; the n-butoxyacetate, M. P. 61.5–3° C. and $[\alpha]_D^{29} +63.0°$; the n-propoxyacetate, M. P. 86.5–8° C. and $[\alpha]_D^{29} +75.9°$; and the 3-(2-propoxy)propanoate, M. P. 61–2.6° C. and $[\alpha]_D^{29} +76.0°$.

The acid chloride, 3-(2-propoxy)propanoyl chloride, used in the preparation of the above mentioned testosterone 3-(2-propoxy)propanoate has not been specifically described in the literature. It is prepared by heating under reflux a mixture of 3-(2-propoxy)propanoic acid and an excess of phosphorus trichloride for thirty minutes. The product is poured away from the syrupy phosphorus acid and distilled several times, the purified 3-(2-propoxy)propanoyl chloride distilling at 99–104° C. at 115–20 mm.

*Example 2*

*Testosterone ethoxyacetate.*—A mixture of 1.0 g. of testosterone, 1 ml. of ethoxyacetyl chloride, and 5 ml. of dry pyridine is shaken overnight. The reaction mixture is poured into about 100 ml. of water. The aqueous mixture is allowed to stand until crystallization is complete. The precipitate is then filtered, washed with water, and recrystallized several times from aqueous methanol to yield the product, testosterone ethoxyacetate, M. P. about 118° C. and $[\alpha]_D^{25} +77.9°$.

Other esters of testosterone which can be prepared in a similar manner include: the methoxyacetate, M. P. 110° C. and $[\alpha]_D^{27} +84.6°$; and the 3-methoxypropanoate, M. P. 102–3° C. and $[\alpha]_D^{25} +79.6$.

The testosterone esters of our invention can also be prepared by treating testosterone with an alkoxyalkanoic anhydride instead of the corresponding alkoxyalkanoyl halide. For example, testosterone ethoxyacetate, given above, is prepared by warming a mixture of testosterone, an excess of ethoxyacetic anhydride, and about five volumes of pyridine for a few hours. The reaction mixture is poured into water and treated as described above in Example 2.

When other alkoxyalkanoyl halides and alkoxyalkanoic anhydrides are substituted for the acyl halides and acid anhydrides used in the above examples, the corresponding testosterone esters are formed. Moreover, the corresponding esters of other hydroxylated hormones are prepared by substituting for testosterone compounds such as 17-methyltestosterone, estrone, estradiol, stilbestrol, desoxycorticosterone, and the like. Preparation of such an ester is given in Example 3.

*Example 3*

*Stilbestrol bis(ethoxyacetate).*—To a solution of 1 g. of stilbestrol in 25 ml. of dry ether and 6 ml. of dry pyridine is added 2 ml. of ethoxyacetyl chloride. The resulting mixture is refluxed one hour, and, after addition of an additional 100 ml. of ether, is poured into water. The ether layer is separated and washed successively with dilute sulfuric acid solution, dilute sodium carbonate solution, and water. Evaporation of the ether leaves a reddish white powder, which is taken up in ether. The ether solution is passed through a small column of activated alumina, and the alumina is eluted with ether. The residue obtained after evaporation of the eluate is recrystallized twice from 95% ethanol. The resulting product, stilbestrol bis(ethoxyacetate), melts at 134–6° C.

Other alkoxyalkanoates of stilbestrol are obtained when, in place of ethoxyacetyl chloride in the above preparation, other alkoxyalkanoyl halides, or alkoxyalkanoic anhydrides, are used.

We claim:

1. A testosterone ester having the formula

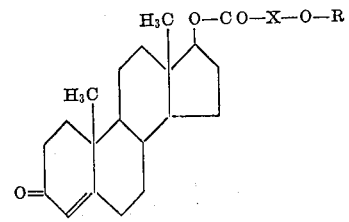

where R is a lower alkyl radical and X is a lower alkylene radical.

2. A testosterone ester having the formula

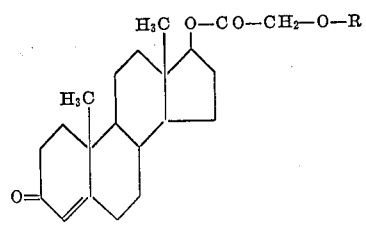

where R is a lower alkyl radical of not more than four carbon atoms.

3. A testosterone ester having the formula

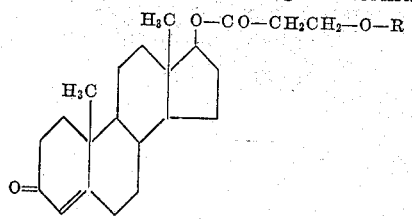

where R is a lower alkyl radical of not more than four carbon atoms.

4. A testosterone ester having the formula

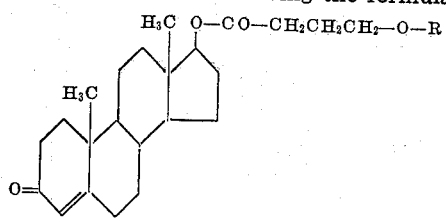

where R is a lower alkyl radical of not more than four carbon atoms.

5. Testosterone ethoxyacetate of the formula

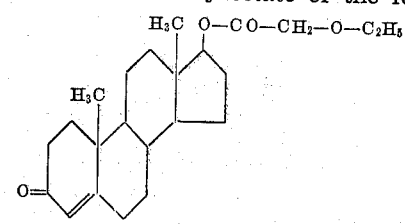

6. Testosterone 3-methoxypropanoate of the formula

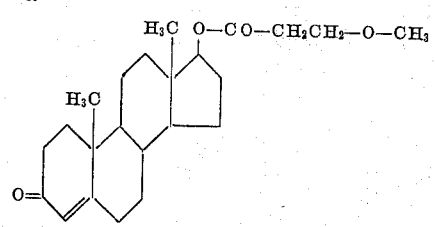

7. Testosterone 4-methoxybutanoate of the formula

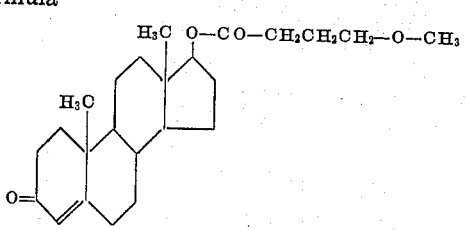

8. A process of preparing an ester of testosterone of the formula

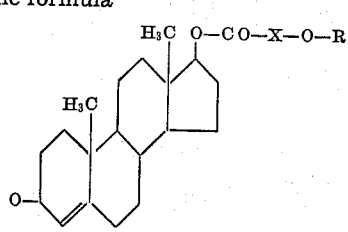

where R is a lower alkyl radical and X is a lower alkylene radical, which comprises reacting a member of the group consisting of lower alkoxyalkanoyl halides and lower alkoxyalkanoic anhydrides with testosterone in the presence of a base.

9. A lower alkoxyalkanoate of a hydroxylated hormone, said hormone being a member of the group consisting of androgens, estrogens and adrenal cortical hormones.

10. The testosterone n-propoxyacetate having the formula

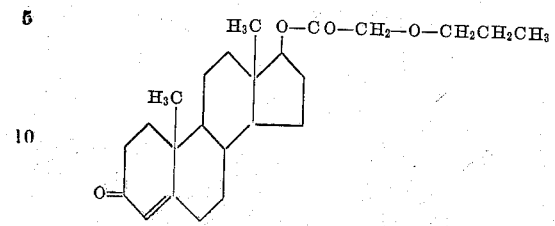

11. The testosterone n-butoxyacetate having the formula

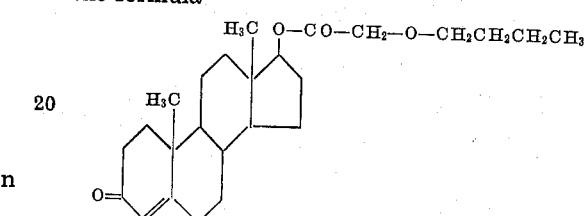

12. A process of preparing an ester of testosterone having the formula

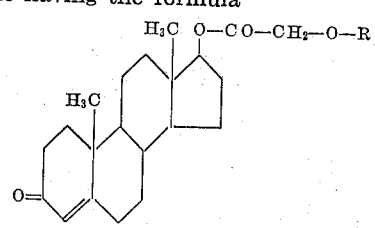

where R is a lower alkyl radical of not more than four carbon atoms, which comprises reacting an alkoxyacetyl halide having the formula, R—O—CH$_2$—CO-halogen, with testosterone in the presence of a base.

13. A process of preparing an ester of testosterone having the formula

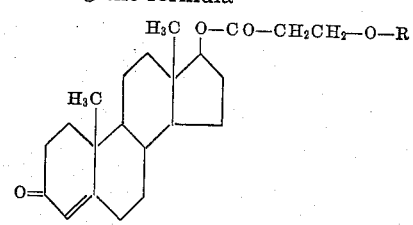

where R is a lower alkyl radical of not more than four carbon atoms, which comprises reacting a 3-alkoxypropanoyl halide having the formula, R—O—CH$_2$CH$_2$—CO-halogen, with testosterone in the presence of a base.

14. A process of preparing an ester of testosterone having the formula

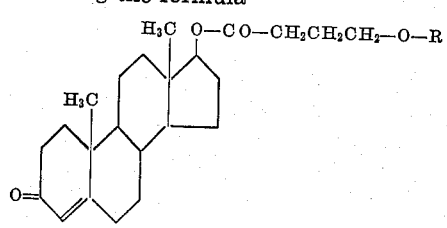

where R is a lower alkyl radical of not more than four carbon atoms, which comprises reacting a 4-alkoxybutanoyl halide having the formula, R—O—CH$_2$CH$_2$CH$_2$—CO-halogen, with testosterone in the presence of a base.

15. A process of preparing testosterone ethoxyacetate having the formula

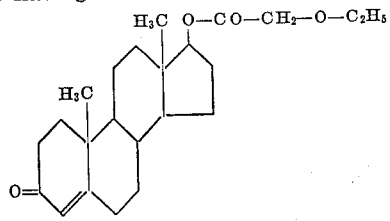

which comprises reacting ethoxyacetyl chloride with testosterone in the presence of pyridine.

16. A process of preparing testosterone 3-methoxypropanoate having the formula

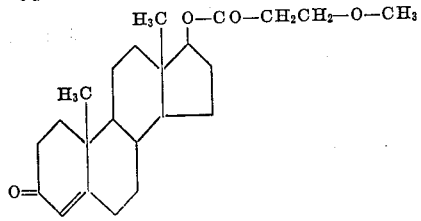

which comprises reacting 3-methoxypropanoyl chloride with testosterone in the presence of pyridine.

17. A process of preparing testosterone 4-methoxybutanoate having the formula

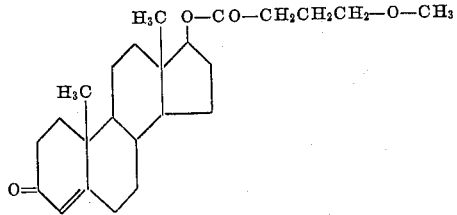

which comprises reacting 4-methoxybutanoyl chloride with testosterone in the presence of pyridine.

18. A process of preparing testosterone n-propoxyacetate having the formula

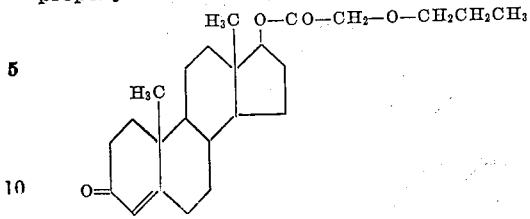

which comprises reacting n-propoxyacetyl chloride with testosterone in the presence of pyridine.

19. A process of preparing testosterone n-butoxyacetate having the formula

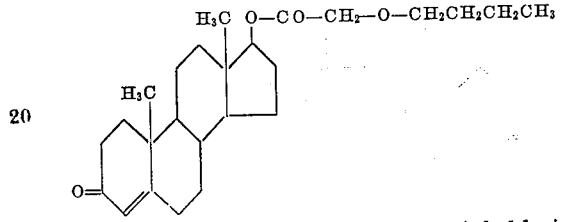

which comprises reacting n-butoxyacetyl chloride with testosterone in the presence of pyridine.

ELMER J. LAWSON.
CHESTER J. CAVALLITO.
ARAM MOORADIAN.

REFERENCES CITED

The following references are of record in the file of this patent:

UNITED STATES PATENTS

| Number | Name | Date |
|---|---|---|
| 2,109,400 | Miescher | Feb. 22, 1938 |